US 6,633,691 B2

(12) United States Patent
Steinberg et al.

(10) Patent No.: US 6,633,691 B2
(45) Date of Patent: Oct. 14, 2003

(54) OPTICAL WAVEGUIDE SWITCH HAVING STEPPED WAVEGUIDE HOLDING MEMBER

(75) Inventors: Dan A. Steinberg, Blacksburg, VA (US); David W. Sherrer, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/845,773

(22) Filed: May 2, 2001

(65) Prior Publication Data

US 2002/0025104 A1 Feb. 28, 2002

Related U.S. Application Data

(60) Provisional application No. 60/201,352, filed on May 2, 2000.

(51) Int. Cl.[7] .................................................. G02B 6/35
(52) U.S. Cl. ........................... 385/16; 385/20; 385/65
(58) Field of Search ............................. 385/16, 65, 15, 385/17, 20, 21

(56) References Cited

U.S. PATENT DOCUMENTS

| 4,150,870 | A | | 4/1979 | d'Auria | 385/45 |
|---|---|---|---|---|---|
| 4,498,730 | A | | 2/1985 | Tanaka et al. | 385/18 |
| 4,699,457 | A | | 10/1987 | Goodman | 385/20 |
| 4,859,022 | A | | 8/1989 | Opdahl et al. | 385/21 |
| 5,127,084 | A | | 6/1992 | Takahashi | 385/140 |
| 5,177,804 | A | | 1/1993 | Shimizu et al. | 385/20 |
| 5,185,825 | A | | 2/1993 | Shigematsu et al. | 385/20 |
| 5,187,758 | A | | 2/1993 | Ueda et al. | 385/16 |
| 5,602,951 | A | * | 2/1997 | Shiota et al. | 385/81 |
| 5,699,463 | A | | 12/1997 | Yang et al. | 385/22 |
| 5,828,800 | A | | 10/1998 | Henry et al. | 385/20 |
| 6,045,270 | A | * | 4/2000 | Weiss et al. | 385/59 |
| 6,328,479 | B1 | * | 12/2001 | Schofield et al. | 385/65 |

FOREIGN PATENT DOCUMENTS

JP          63085522          4/1988

* cited by examiner

Primary Examiner—Michael C. Zarroli
(74) Attorney, Agent, or Firm—Dann Dorfman Herrell and Skillman, P.C.

(57) ABSTRACT

A first waveguide holding member has a principal surface which confronts the principal surface of a second waveguide holding member. Each principal surface has a stepped configuration defined by an upper surface region, a lower surface region and a transverse region which separates the upper and lower surface regions. At least guide member guides the first and second waveguide holding members to operatively couple and decouple opposing ends of first and second optical waveguides which terminate at the transverse regions of the first and second waveguide holding members, respectively.

29 Claims, 9 Drawing Sheets

OPTICAL WAVEGUIDE SWITCH HAVING STEPPED WAVEGUIDE HOLDING MEMBER

CROSS-REFERENCE TO RELATED APPLICATIONS

Priority is claimed to U.S. Provisional Application Ser. No. 60/201,352, filed May 2, 2000, the entirety of which is incorporated herein by reference.

BACKGROUND OF THE INVENTION

1. Field of the Invention

The present invention generally relates to optical switches, and more particularly, the present invention relates to devices for selectively coupling optical fibers or waveguides.

2. Background of the Invention

The increasing demand for high-speed voice and data communications has led to an increased reliance on optical communications, particularly optical fiber communications. The use of optical signals as a vehicle to carry channeled information at high speeds is preferred in many instances to carrying channeled information at other electromagnetic wavelengths/frequencies in media such as microwave transmission lines, co-axial cable lines and twisted pair transmission lines. Advantages of optical media are, among others, high-channel (bandwidth), greater immunity to electromagnetic interference, and lower propagation loss. In fact, it is common for high-speed optical communication system to have signal rates in the range of approximately several Giga bits per second (Gbit/sec) to approximately several tens of Gbit/sec.

One way of carrying information in an optical communication system, for example an optical network, is via an array of optical fibers. Ultimately, the optical fibers may be coupled to another array of waveguides, such as another optical fiber array, or a waveguide array of an optoelectronic integrated circuit (OEIC). In order to assure the accuracy of the coupling of the fiber array to another waveguide array, it becomes important to accurately position each optical fiber in the array.

Optical switches serve a variety of applications in optical communication systems. Once type of such optical switches are mechanical switches. Mechanical optical switches have been used in a variety of optical fiber routing applications to switch between particular optical signal pads to provide reliable optical transmission routes for carrying optical signals.

SUMMARY OF THE INVENTION

According to an exemplary embodiment of the present invention, an optical switch includes first and second waveguide holding members each having a stepped surface configuration defined by an upper surface region, a lower surface region and a transverse region which separates the upper and lower surface regions. At least one first optical waveguide has an end which terminates at the transverse region of the first waveguide holding member, and at least one second optical waveguide has an end which opposes the end of the first optical waveguide and which terminates at the transverse region of the second waveguide holding member. A guide member guides the first and second waveguide holding members relative to each other to operatively couple and decouple the opposing ends of first and second optical waveguides.

According to another exemplary embodiment of the present invention, an optical switch includes a first waveguide holding member having a stepped convex surface configuration and a second waveguide holding member having a stepped concave surface configuration. An upper surface region of the first waveguide holding member includes no at least one transitional optical waveguide. Also, an upper surface region of the second waveguide holding member includes at least one input optical waveguide, and another upper surface region of the second waveguide holding member includes at least one output waveguide. The respective surface regions are aligned such that the transitional optical waveguide is interposed between the input optical waveguide and the output is optical waveguide. A guide member guides the first and second waveguide holding members relative to each other to operatively couple and decouple the ends of the input and output optical waveguides to opposing ends of the transitional optical waveguide.

BRIEF DESCRIPTION OF THE DRAWINGS

The invention is best understood from the following detailed description when read with the accompanying drawings. It is emphasized that the various features are not necessarily drawn to scale. In fact, the dimensions may be arbitrarily increased or decreased for clarity of discussion.

DETAILED DESCRIPTION OF THE PREFERRED EMBODIMENTS

In the following detailed description, for purposes of explanation and not limitation, exemplary embodiments disclosing specific details are set forth in order to provide a thorough understanding of the present invention. However, it will be apparent to one having ordinary skill in the art having the benefit of the present disclosure, that the present invention may be practiced in other embodiments that depart from the specific details disclosed herein. Moreover, descriptions of well-known devices, methods and materials may be omitted so as to not obscure the description of the present invention.

According to an exemplary embodiment of the present invention, an optical switch includes a first waveguide holding member and a second waveguide holding member.

The first waveguide holding member holds at least one first optical waveguide, and the second waveguide holding member holds at least one second optical waveguide.

Advantageously, the first waveguide holding member moves transversely relative to the second waveguide holding member. The transverse motion enables selective coupling between the optical waveguides thereof.

Figure 1:
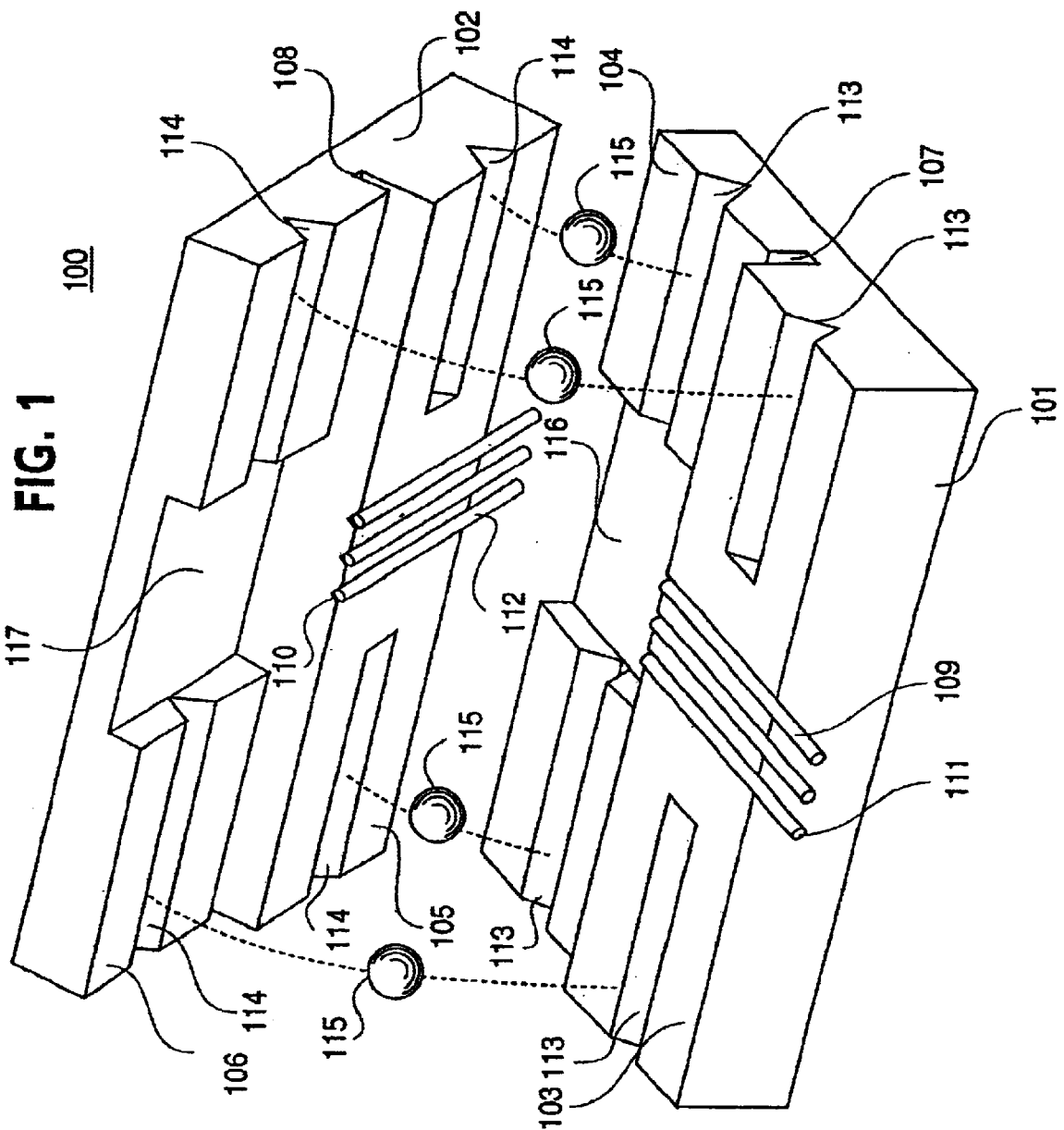
FIG. 1 is an exploded perspective view of an optical switch according to an illustrative embodiment of the present invention.

FIG. 1 is a perspective view of an optical switch 100 according to an illustrative embodiment of the present invention. The switch 100 generally includes a first waveguide holding member 101 and a second waveguide holding member 102. Although first and second waveguide holding members 101 and 102 have identical structures in the present embodiment, these members 101 and 102 may be configured so as to have different structures.

The first waveguide holding member 101 has a stepped principal surface which includes an upper surface region 103 and a lower surface region 104. The upper surface region 103 of the first waveguide holding member 101 is separated from the lower surface region 104 by a transverse region 107. Likewise, the second waveguide holding member 102 has a stepped principal surface which includes an upper surface region 105 and a lower surface region 106. The upper surface region 105 of the second waveguide holding member 102 is separated from the lower surface region 106 by another transverse region 108. When the optical switch 100 is assembled, the upper surface region 103 of the waveguide holding member 101 confronts the lower surface region 106 of the waveguide holding member 102, the lower surface region 104 of the waveguide holding member 101 confronts the upper surface region 105 of the waveguide holding member 103, and the transverse region 107 confronts the transverse region 108.

Referring still to FIG. 1, one or more grooves 109 are optionally formed within the upper surface region 105 of the first waveguide holding member 101. Also, one or more grooves 110 are optionally formed within the upper surface region 105 of the first waveguide holding member 101. Preferably, the grooves 109 and 110 extend perpendicular to the transverse regions 107 and 108, respectively. As illustrated, optical fibers 111 are placed within the grooves 109 such that the ends thereof terminate at the transverse region 107 of the first waveguide holding member 101. Similarly, optical fibers 112 are placed within the grooves 110 such that the ends thereof terminate at the transverse region 108 of the first waveguide holding member 101.

With or without the presence of the grooves 109 and 110, the fibers 111 and 112 can be bonded to the waveguide holding members 101 and 102 with epoxy, solder, thermocompression bonding using aluminum or other suitable techniques. Also, the fibers 111 and 112 can be soldered to metal pads on the waveguide holding members 101 and 102. Further, the fibers 111 and 112 can be replaced with integrated waveguides, such as SiO2 waveguides, or silicon or InP rib waveguides.

Further, each of the first and second waveguide holding members 101 and 102 optionally includes recessed regions 116 and 117 which are positioned opposite the optical fibers 112 and 111, respectively.

When the optical switch 100 is assembled, selective coupling of the ends of the optical fibers 111 and 112 is achieved by transverse movement of the first waveguide holding member 101 relative to the second waveguide holding member 102. In this embodiment, transverse movement is enabled by the combination of opposing transverse elongate recesses and guide balls (e.g., ball lenses). In particular, the principal surface of the first waveguide holding member 101 includes a plurality of transverse elongate recesses 113. Likewise, the principal surface of the second waveguide holding member is 102 includes a corresponding plurality of transverse elongate recesses 114. When assembled, the recesses 113 and the corresponding recesses 114 together define a plurality of elongate cavities extending in the transverse direction.

Within each of the thus formed cavities is placed a guide ball 115. The diameter of each guide ball 115 is sufficient so as to minimize frictional contact between the opposing surfaces of the first and second waveguide holding members 101 and 102. The guide balls 115 may be formed of ceramics, metals or other hard materials. For example, the guide balls 115 may be formed of quartz, silicon nitride or zirconium. Also, the waveguide holding members 101 and 102, and particularly the recesses 113 and 114, may optionally be coated with a wear-resistant material (e.g., CVD silicon nitride).

As should be readily apparent, the rolling action of the guide balls 115 allows for transverse movement of the first waveguide holding member 101 relative to the second waveguide holding member 102. In this manner, the ends of the optical fibers 111 may be selectively aligned with (and therefore optically coupled with) the ends of the optical fibers 112. An optical switch is thereby realized.

Motion of the first waveguide holding member 101 relative to the second waveguide holding member 102 may be through use of any number of known actuators, including, but not limited to, electromagnetic, piezoelectric, microelectro-mechanical (MEM), and hydraulic devices. Also, either one of the first and second waveguide holding members 101 and 102 may be secured in a fixed position, while movement of the other is actuated.

Figure 2:
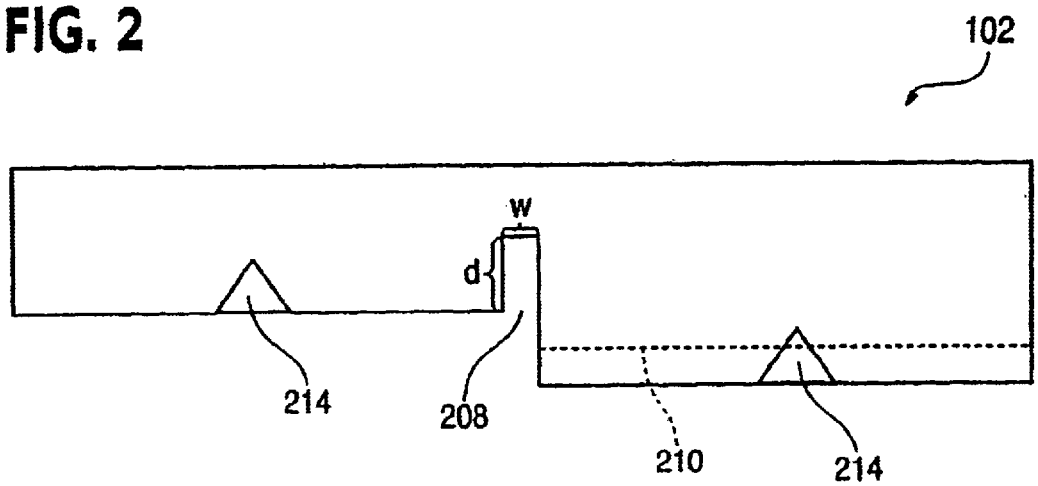
FIGS. 2, 3 and 4 are side elevational views of one or more waveguide holding members according to the illustrative embodiment of the present invention.

FIG. 2 is a cross-sectional view of the waveguide holding member 102 shown in FIG. 1. The waveguide holding member 101 is similarly configured. Although not so limited, the body of the waveguide holding members 101 and 102 may be formed of silicon. Reference number 214 denotes the transverse elongate recesses which receive the guide balls. As shown, the recesses 214 may have a V-shaped cross-section. The dashed-line 210 of the figure denotes the grooves for placement of the optical fibers. Again, these grooves may have a V-shaped configuration.

Reference number 208 of FIG. 2 denotes the transverse region of waveguide holding member 102. As shown, the transverse region 208 may include an elongate groove formed at a depth d and a width w which provides separation between the upper and lower surface regions of the waveguide holding member 102. The groove may be formed, for example, by a dicing saw or a dry etch process.

Figure 3:
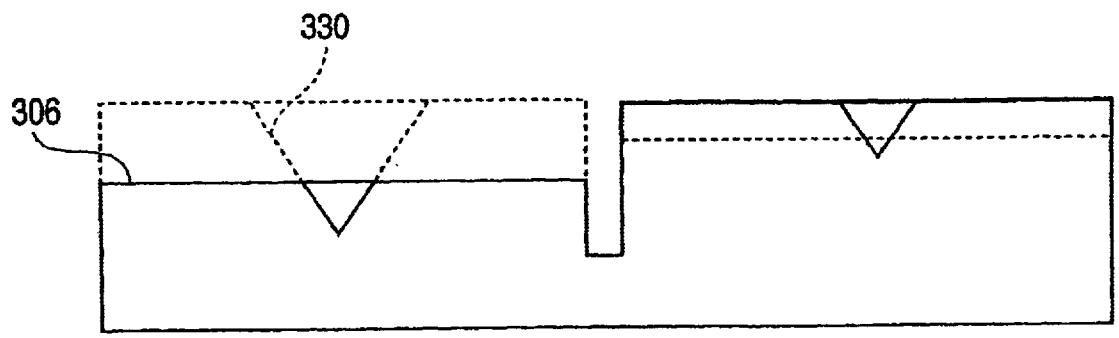

FIG. 3 is a view similar to that of FIG. 2, except that the region 330 has been added to illustrate the portion of the member body that is removed to define the lower surface region 306. This region 330, as well as the recessed regions 116 and 117 of FIG. 1, may be removed any number of ways, including by use of a dicing saw and/or wet etching.

Figure 4:
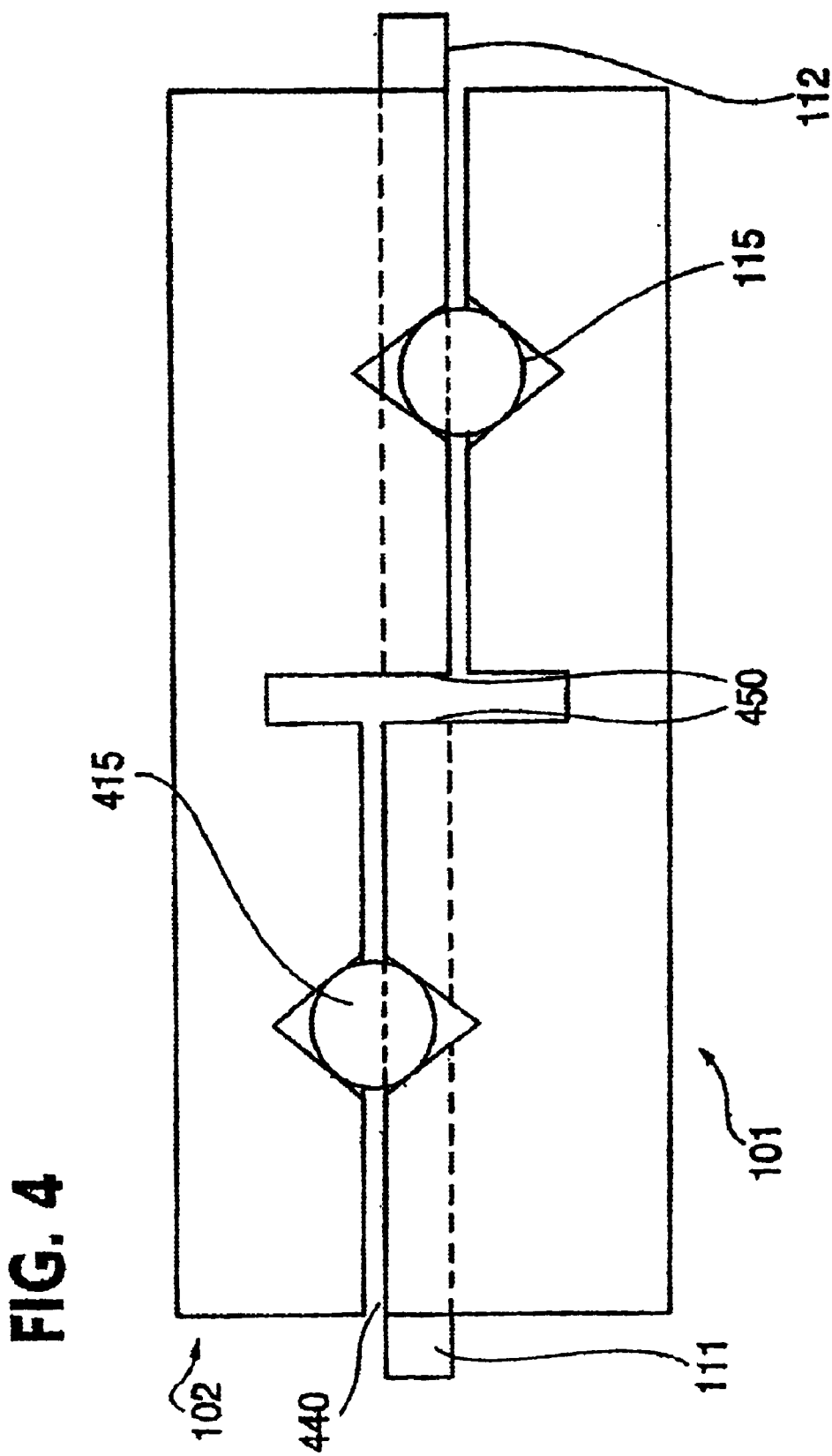

FIG. 4 is a side elevational view showing the face-to-face positional relationship between the first and second waveguide holding members 101 and 102 of FIG. 1. As mentioned previously, the diameter of the guide balls 415 is sufficient to minimize frictional contact between the opposing surfaces of the members 101 and 102. This is accomplished by the formation of a gap 440 between the opposing surfaces of the members 101 and 102. Further, diameter of the guide balls 315 is selected to align the vertical positions of the optical fibers 411 and 412, thereby allowing for optical alignment of the opposing ends 450.

Prior to final assembly of the optical switch, a dicing saw may be used to cut the ends 45 of the optical fibers 411 and 412, respectively. Also, the fibers and the groove along the transverse regions (208 of FIG. 2) may be cut in a same fabrication step, thereby resulting in the fiber ends being flush with groove sidewall. Since the dicing saw produces a rough fiber end face, an index matching liquid may be disposed between the opposing ends of the fibers 411 and 412. Optionally, the fiber ends may be partially polished. As one example only, a fine 0.5–3 micron grit polish may be used.

With regard to polishing, one option is to fully polish the ends of the optical fibers 411 and 412 after they are placed in the V-shaped grooves and cut as mentioned above. However, this approach may prove difficult in some cases since the fiber ends should be accurately located. For example, the distance between the fiber ends should preferably be less than 15 microns. Another option is to fully polish the ends of the optical fibers 411 and 412 before the fibers are placed in the V-shaped grooves. In this case, the fiber ends should be butted against a fiducial aligned in the transverse region.

Figure 5:
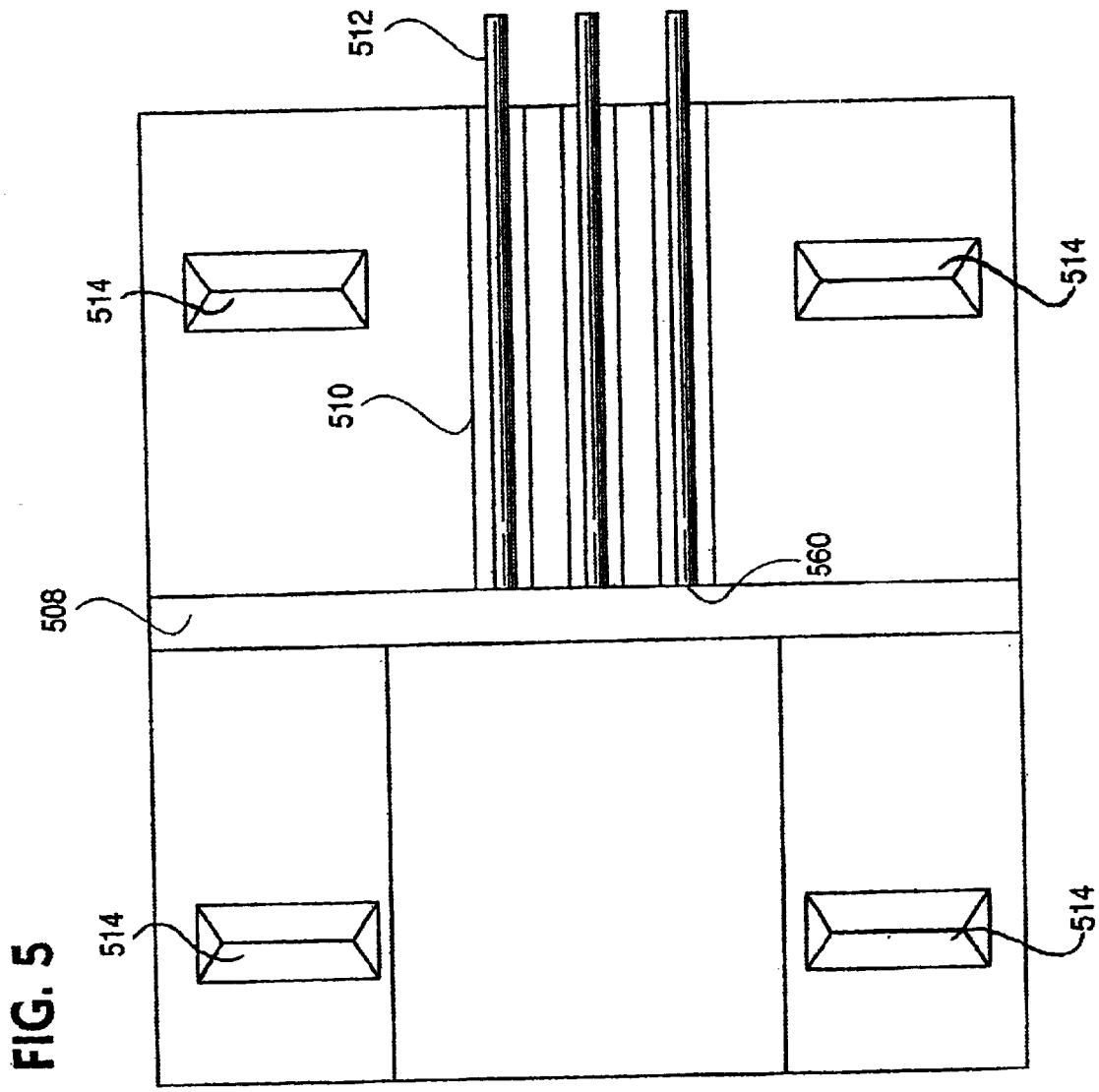
FIG. 5 is a plan view of a waveguide holding member according to the illustrative embodiment of the present invention.

Turning now to FIG. 5, a top view of the second waveguide holding member 102 of FIG. 1 is shown. Again, the first waveguide holding member 101 is similarly configured. Reference number 512 denotes the optical fibers placed within the grooves 510. The optical fibers 512 have ends 560 which terminate at the transverse region 508. Also, the elongate transverse recesses 514 may be disposed symmetrically at the four corner regions as shown. It is also possible to provide fewer then four recesses 514 and more than four recesses 514. The recesses may be formed, for example, by anisotropic wet etching of silicon. Recesses 514 of precise length can be employed to provide mechanical stops for the optical switch. In this case, the length of the recesses 514 determines the maximum transverse travel distance.

Figure 6:
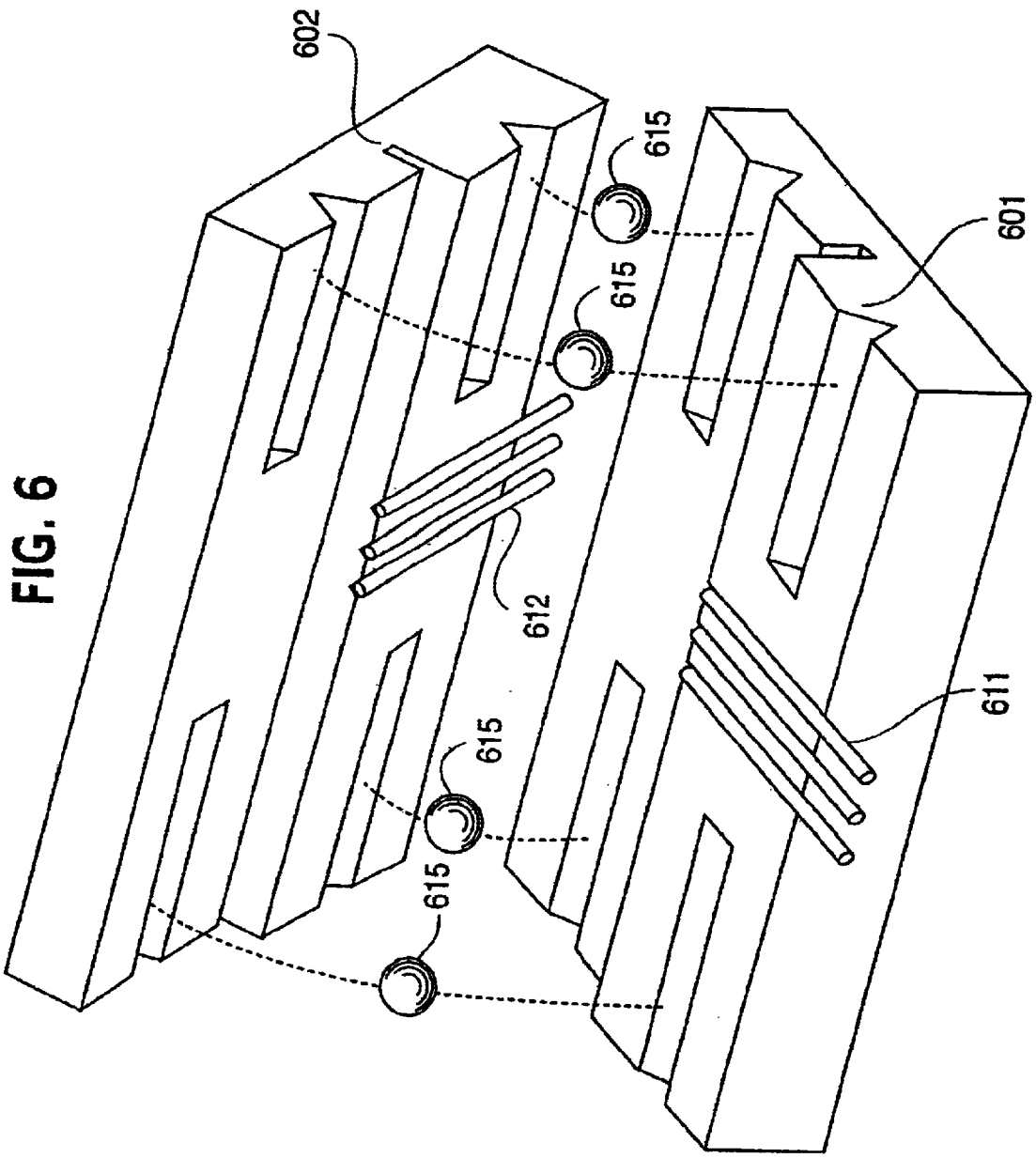
FIG. 6 is an exploded perspective view of an optical switch according to a modified illustrative embodiment of the present invention.

As stated previously, the recessed portions 116 and 117 of the waveguide holding members 101 and 102 shown in FIG. 1 are optional. FIG. 6 illustrates a modified embodiment of the present invention in which the waveguide holding members 601 and 602 are devoid of the aforementioned recesses. In this case, the members 601 and 602 should be held far enough apart (e.g. by the guide balls 615) to avoid impacting the waveguides 611 and 612.

Figure 7:
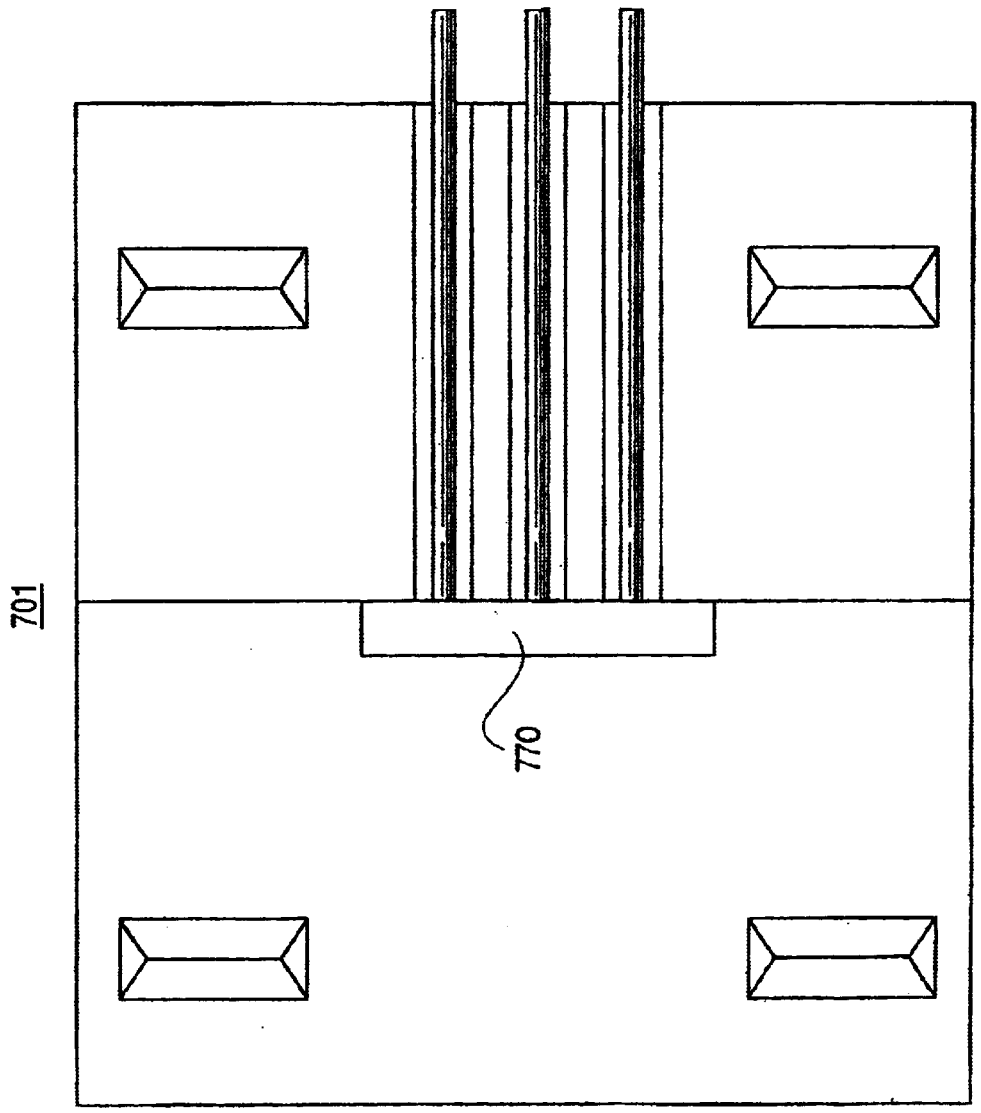
FIG. 7 is a plan view of a waveguide holding member according to a modified illustrative embodiment of the present invention.

Also, it is not necessary for the transverse regions to include the grooves illustrated above which extend completely across the waveguide holding members in the transverse region. The grooves may be absent altogether, or as shown by the top-view of the waveguide holing member 701 of FIG. 7, each groove 770 may extend only partially across the transverse region. In this case, the groove 770 may be formed, for example, by directional dry etching.

Figure 8:
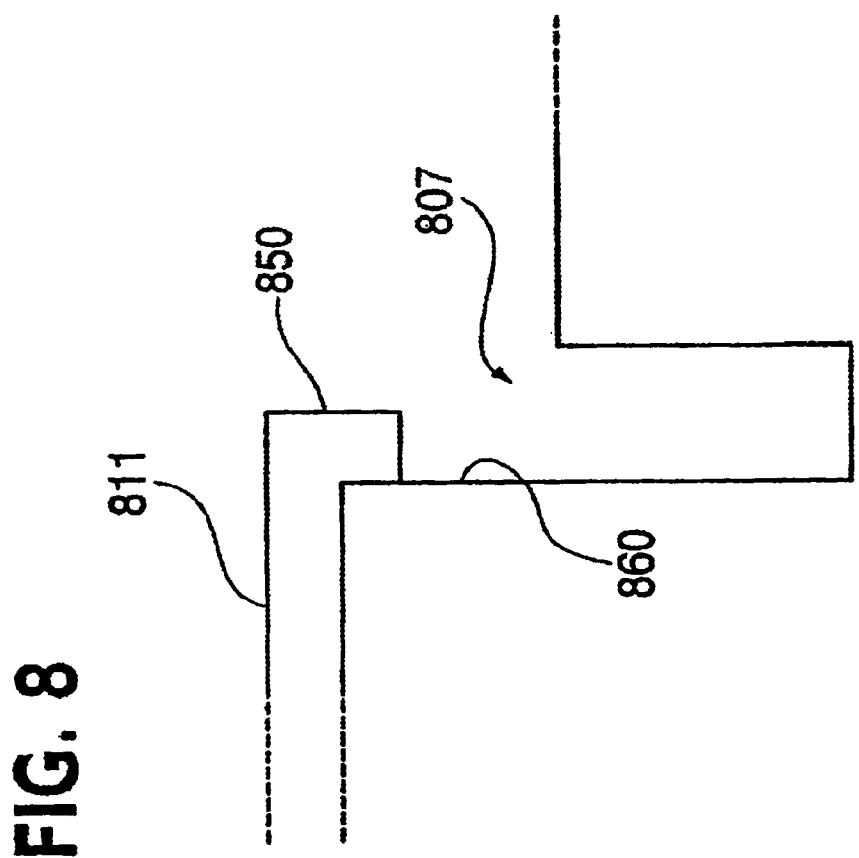
FIG. 8 is a side elevational view of a transverse region of a waveguide holding member according to a modified illustrative embodiment of the present invention.

Further, as shown in FIG. 8, it is not necessary to have the fiber ends 850 flush with the sidewall 860 of the transverse region 807. Rather, the ends 850 may overhang the sidewall 860 so long as the waveguides 811 are positioned accurately.

Still further, the guide balls for guiding the first waveguide holding member relative to the second waveguide holding member may be replaced with other suitable components. For example, transverse cylinders may be provided which function as guide rails. In this case, the waveguide holding members slide along the guide cylinders, as opposed to rolling on the guide balls. The cylinders can be formed, for example, of precision-drawn glass fibers.

Another embodiment of an optical switch according to the present invention will now be described with reference to FIG. 9 and FIG. 10. In particular, FIG. 9 illustrates a side elevational view of the other embodiment, and FIG. 10 illustrates a cross-sectional top view of the other embodiment taken along the line 10—10 in FIG. 9.

Figure 9:
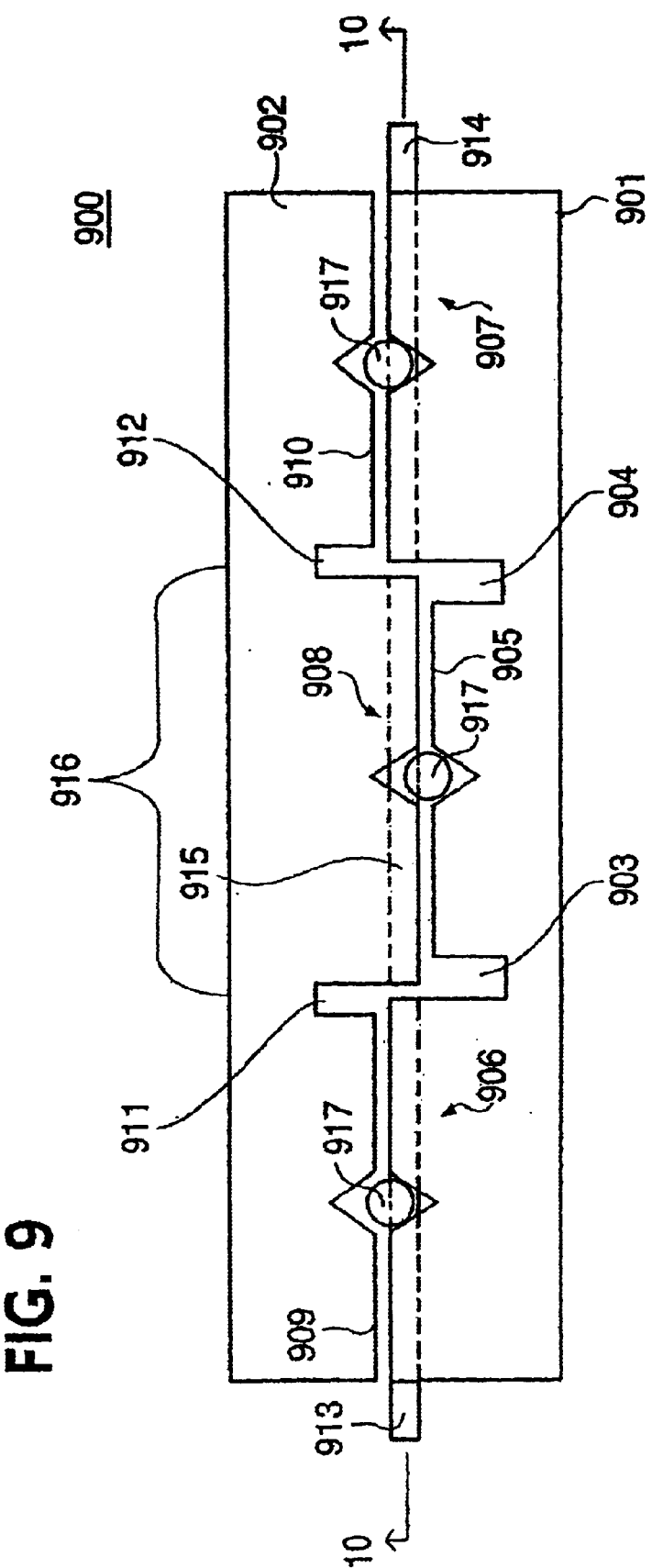
FIG. 9 is a side elevational view of an optical switch according to another illustrative embodiment of the present invention.
Figure 10:
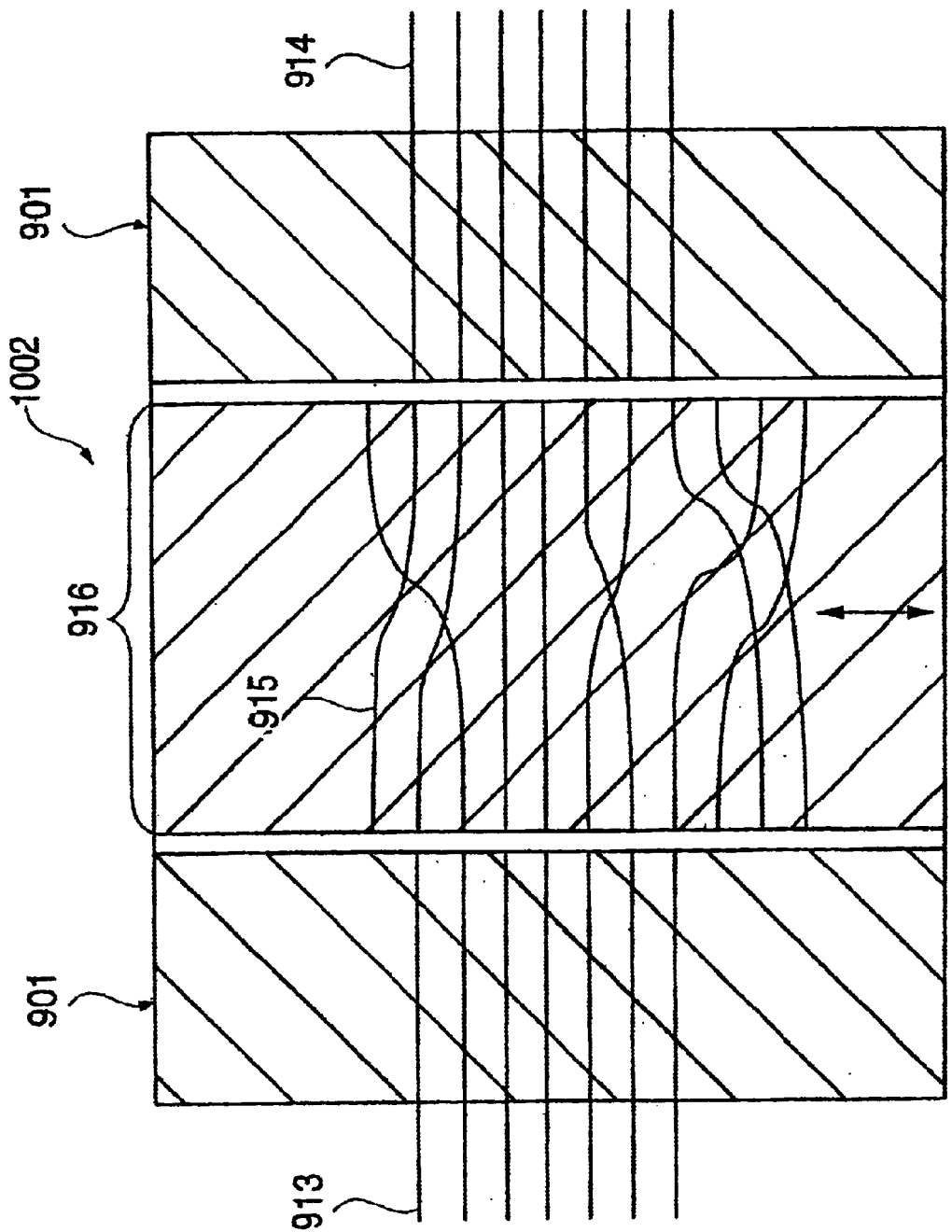
FIG. 10 is a cross-sectional view taken along the line 10—10 of the optical switch according to the other illustrative embodiment of the present invention.

As shown in FIG. 9, the optical switch 900 includes a first waveguide holding member 901 and a second waveguide holding member 902. The first waveguide holding member 901 has a concave stepped configuration in which lower surface region 905 is located between two upper surface regions 906 and 907. A transverse region 903 separates one of the upper surface regions 906 from the lower surface region 905, and another transverse region 904 separates the other upper surface region 907 from the lower surface region 905.

The second waveguide holding member 902 has a convex stepped configuration in which an upper surface region 908 is located between two lower surface regions 909 and 910. As shown, a transverse region 911 separates one of the lower surface regions 909 from the upper surface region 908, and another transverse region 912 separates the other lower surface region 910 from the upper surface region 908.

Reference numbers 913 and 914 of FIG. 9 denote input and output optical fibers, respectively. As with the previous embodiment, the optical fibers are placed in grooves on a surfaces of the waveguide holding member. In particular, the optical fibers 913 extend within grooves formed in the upper surface region 906 of the first waveguide holding member and terminate at the transverse region 903. Likewise, the optical fibers 914 extend within grooves formed in the upper surface region 907 of the first waveguide holding member 901 and terminate at the transverse region 904.

Reference number 916 denotes a transitional or middle section which includes transitional optical waveguides 915 interposed between the ends of the input and output optical fibers 913 and 914. These waveguides 915 are located on or within the upper surface region 608 of the second waveguide holding member 902.

Like the previous embodiment, transverse movement of the first waveguide holding member 901 relative to the second waveguide holding member 902 is obtained by the provision of guide balls 917 in respective elongate cavities formed by opposed recesses in the surfaces of the waveguide holding members 901 and 902. Also, the guide balls 917 are dimensioned to equalize the heights of the ends of the optical fibers 913 and 914 and the ends of the transitional optical waveguides 915, thereby allowing optical coupling therebetween.

FIG. 10 is a cross-sectional plan view of the optical switch of FIG. 9. The transitional section 916 is movable in the transverse direction (represented by the two-headed arrow). As such, selected ones of the fibers 913 may be optically coupled to selected ones of the fibers 914 via the transitional waveguides 915 depending on the relative positions of the waveguide holding members 901 and 902. In this manner, selective routing may be realized.

While the invention has been described in detail with respect to a number of exemplary embodiments, it is clear that various modifications of the invention will become apparent to those having ordinary skill in art having had benefit of the present disclosure. Such modifications and variations are included in the scope of the appended claims.

What is claimed is:

1. An optical switch comprising:
   a first waveguide holding member having a principal surface, wherein the principal surface of the first waveguide holding member has a stepped configuration defined by an upper surface region, a lower surface region and a transverse region which separates the upper and lower surface regions;

a second waveguide holding member having a principal surface which faces the principal surface of the first waveguide holding member, wherein the principal surface of the second waveguide holding member has a stepped configuration defined by an upper surface region, a lower surface region and a transverse region which separates the upper and lower surface regions, and wherein the upper surface region of the first waveguide holding member confronts the lower surface region of the second waveguide holding member, and wherein the lower surface region of the first waveguide holding member confronts the upper surface region of the second waveguide holding member, and wherein the transverse region of the first waveguide holding ember confronts the transverse region of the second waveguide holding member; and at least one guide member which is operatively coupled to the first and second waveguide holding members and which guides the first waveguide holding member in a transverse direction relative to the second waveguide holding member.

2. The optical switch as claimed in claim 1, wherein the upper surface region of the first waveguide holding member includes a first groove terminating at the transverse region of the principal surface of the first waveguide holding member, and wherein the upper surface region of the second waveguide holding member includes a second groove terminating at the transverse region of the principal surface of the second waveguide holding member.

3. The optical switch as claimed in claim 2, further comprising a first optical waveguide extending within the first groove and having an end terminating at the transverse region of the first waveguide holding member, and a second optical waveguide extending within the second groove and having an end terminating at the transverse region of the second waveguide holding member.

4. The optical switch as claimed in claim 3, wherein the guide member guides the first and second waveguide holding members to selectively optically couple the ends of the first and second optical waveguides.

5. The optical switch as claimed in claim 2, wherein the first and second grooves extend perpendicular to the transverse direction.

6. The optical switch as claimed in claim 4, wherein the first and second grooves extend perpendicular to the transverse direction.

7. The optical switch as claimed in claim 1, wherein the upper surface region of the first waveguide holding member includes a plurality of first grooves terminating at the transverse region of the principal surface of the first waveguide holding member, and wherein the upper surface region of the second waveguide holding member includes a plurality of second grooves terminating at the transverse region of the principal surface of the second waveguide holding member.

8. The optical switch as claimed in claim 7, further comprising a plurality of first optical waveguides respectively extending within the first grooves and having ends terminating at the transverse region of the first waveguide holding member, and a plurality of second optical waveguides respectively extending within the second grooves and having ends terminating at the transverse region of the second waveguide holding member.

9. The optical switch as claimed in claim 8, wherein the guide member guides the first and second waveguide holding members to selectively optically couple the first and second ends of the first and second optical waveguides, respectively.

10. The optical switch as claimed in claim 7, wherein the first grooves and the second grooves extend perpendicular to the transverse direction.

11. The optical switch as claimed in claim 9, wherein the first grooves and the second grooves extend perpendicular to the transverse direction.

12. The optical switch as claimed in claim 1, wherein the principal surface of the first waveguide holding member includes a plurality of first elongate recesses, and the principal surface of the second waveguide holding member includes a plurality of second elongate recesses, and wherein the plurality of first elongate recesses respectively confront the plurality of second elongate recesses to define a plurality of elongate cavities extending in the transverse direction between the first and second waveguide holding members, and wherein the at least one guide member includes a plurality of guide balls respectively contained within said plurality of elongate cavities.

13. The optical switch as claimed in claim 8, wherein the principal surface of the first waveguide holding member includes a plurality of first elongate recesses, and the principal surface of the second waveguide holding member includes a plurality of second elongate recesses, and wherein the plurality of first elongate recesses respectively confront the plurality of second elongate recesses to define a plurality of elongate cavities extending in the transverse direction between the first and second waveguide holding members, and wherein the at least one guide member includes a plurality of guide balls respectively contained within said plurality of elongate cavities.

14. The optical switch as claimed in claim 1, wherein the upper surface region of the principal surface of the first waveguide holding member includes a plurality of first elongate recesses, and the lower surface region of the principal surface of the second waveguide holding member includes a plurality of second elongate recesses, and wherein the plurality of first elongate recesses respectively confront the plurality of second elongate recesses to define a plurality of first elongate cavities extending in the transverse direction between the first and second waveguide holding members, and wherein the lower surface region of the principal surface of the first waveguide holding member includes a plurality of third elongate recesses, and the upper surface region of the principal surface of the second waveguide holding member includes a plurality of fourth elongate recesses, and wherein the plurality of third elongate recesses respectively confront the plurality of fourth elongate recesses to define a plurality of second elongate cavities extending in the transverse direction between the first and second waveguide holding members, and wherein the at least one guide member includes a plurality of guide balls respectively contained within said plurality of first and second elongate cavities.

15. The optical switch as claimed in claim 8, wherein the upper surface region of the principal surface of the first waveguide holding member includes a plurality of first elongate recesses, and the lower surface region of the principal surface of the second waveguide holding member includes a plurality of second elongate recesses, and wherein the plurality of first elongate recesses respectively confront the plurality of second elongate recesses to define a plurality of first elongate cavities extending in the transverse direction between the first and second waveguide holding members, and wherein the lower surface region of the principal surface of the first waveguide holding member includes a plurality of third elongate recesses, and the upper surface region of the principal surface of the second waveguide holding member includes a plurality of fourth elongate recesses, and wherein the plurality of third elongate recesses respectively confront the plurality of fourth elongate recesses to define a plurality of second elongate cavities extending in the transverse direction between the first and second waveguide holding members, and wherein the at least one guide member includes a plurality of guide balls respectively contained within said plurality of first and second elongate cavities.

16. An optical switch comprising:

a first waveguide holding member having a principal surface, wherein the principal surface of the first waveguide holding member has a stepped configuration defined by an upper surface region, a lower surface region and a transverse region which separates the upper and lower surface regions;

a second waveguide holding member having a principal surface which faces the principal surface of the first waveguide holding member, wherein the principal surface of the second waveguide holding member has a stepped configuration defined by an upper surface region, a lower surface region and a transverse region which separates the upper and lower surface regions;

at least one guide member which is operatively coupled to the first and second waveguide holding members and which guides the first waveguide holding member in a transverse direction relative to the second waveguide holding member; and at least one first optical waveguide having a first end terminating at the transverse region of the first waveguide holding member, and at least one second optical waveguide having a second end terminating at the transverse region of the second waveguide holding member.

17. The optical switch as claimed in claim 16, wherein the guide member guides the first and second waveguide holding members to selectively optically couple the first and second ends of the first and second optical waveguides, respectively.

18. The optical switch as claimed in claim 17, wherein the first and second optical waveguides are optical fibers.

19. An optical switch comprising:

a first waveguide holding member having a principal surface, wherein the principal surface of the first waveguide holding member has a convex stepped configuration defined by a first lower surface region, an upper surface region, a first transverse region which separates the first lower surface region and the upper surface region, a second lower surface region, and a second transverse region which separates the upper surface region and the second lower surface region;

a second waveguide holding member having a principal surface which faces the principal surface of the first waveguide holding member, wherein the principal surface of the second waveguide holding member has a concave stepped configuration defined by a first upper surface region, a lower surface region, a first transverse region which separates the first upper surface region and the lower surface region, a second upper surface region, and a second transverse region which separates the lower surface region and the second upper surface region, and at least one guide member which is operatively coupled to the first and second waveguide holding members and which guides the first waveguide holding member in a transverse direction relative to the second waveguide holding member.

20. The optical switch as claimed in claim 19, wherein the upper surface region of the first waveguide holding member confronts the lower surface region of the second waveguide holding member, wherein the first lower surface region of the first waveguide holding member confronts the first upper surface region of the second waveguide holding member, wherein the second lower surface region of the first waveguide holding member confronts the second upper surface region of the second waveguide holding member, wherein the first transverse region of the first waveguide holding member confronts the first transverse region of the second waveguide holding member, and wherein the second transverse region of the first waveguide holding member confronts the second transverse region of the second waveguide holding member.

21. The optical switch as claimed in claim 20, wherein the first waveguide holding member includes a plurality of transitional optical waveguides each having opposite first and second ends respectively terminating at the first and second transverse regions of the first waveguide holding member.

22. The optical switch as claimed in claim 21, wherein the first upper surface region of the second waveguide holding member includes a plurality of first grooves terminating at the first transverse region of the principal surface of the second waveguide holding member, and wherein the second upper surface region of the second waveguide holding member includes a plurality of second grooves terminating at the second transverse region of the principal surface of the second waveguide holding member.

23. The optical switch as claimed in claim 22, further comprising a plurality of first optical waveguides respectively extending within the first grooves and each having an end terminating at the first transverse region of the second waveguide holding member, and a plurality of second optical waveguides respectively extending within the second grooves and each having an end terminating at the second transverse region of the second waveguide holding member.

24. The optical switch as claimed in claim 23, wherein the guide member guides the first and second waveguide holding members to selectively optically couple the ends of the first optical waveguides and the first ends of the transition optical waveguides, respectively, and to selectively optically couple the ends of the second optical waveguides and the second ends of the transition optical waveguides, respectively.

25. The optical switch as claimed in claim 24, wherein the first grooves and second grooves extend perpendicular to the transverse direction.

26. The optical switch as claimed in claim 25, wherein the principal surface of the first waveguide holding member includes a plurality of first elongate recesses, and the principal surface of the second waveguide holding member includes a plurality of second elongate recesses, and wherein the plurality of first elongate recesses respectively confront the plurality of second elongate recesses to define a plurality of elongate cavities extending in the transverse direction between the first and second waveguide holding members, and wherein the at least one guide member includes a plurality of guide balls respectively contained within said plurality of elongate cavities.

27. The optical switch as claimed in claim 26, wherein the first and second optical waveguides are optical fibers.

28. The optical switch as claimed in claim 19, wherein the principal surface of the first waveguide holding member includes a plurality of first elongate recesses, and the principal surface of the second waveguide holding member includes a plurality of second elongate recesses, and wherein the plurality of first elongate recesses respectively confront the plurality of second elongate recesses to define a plurality of elongate cavities extending in the transverse direction between the first and second waveguide holding members, and wherein the at least one guide member includes a plurality of guide balls respectively contained within said plurality of elongate cavities.

29. The optical switch as claimed in claim 20, wherein the principal surface of the first waveguide holding member includes a plurality of first elongate recesses, and the principal surface of the second waveguide holding member includes a plurality of second elongate recesses, and wherein the plurality of first elongate recesses respectively confront the plurality of second elongate recesses to define a plurality of elongate cavities extending in the transverse direction between the first and second waveguide holding members, and wherein the at least one guide member includes a plurality of guide balls respectively contained within said plurality of elongate cavities.

* * * * *